No. 728,972. PATENTED MAY 26, 1903.
J. L. PITTMAN.
CONVEYER CHAIN LINK.
APPLICATION FILED MAR. 5, 1903.
NO MODEL.
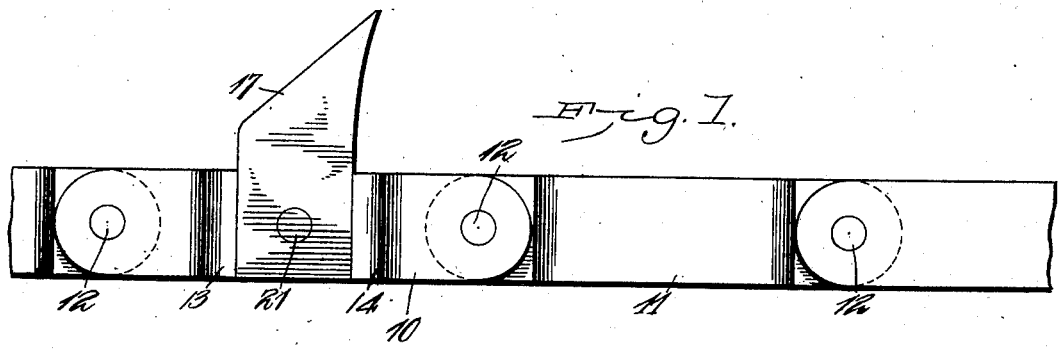
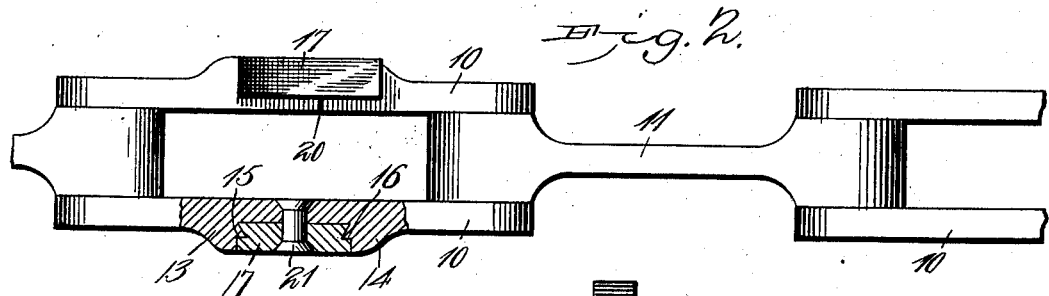
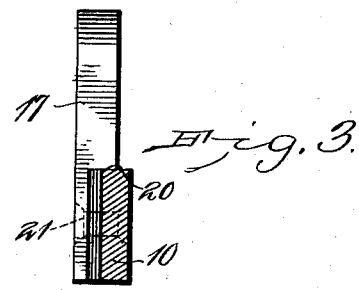
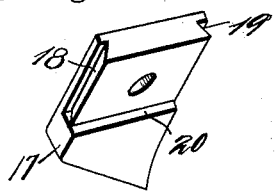
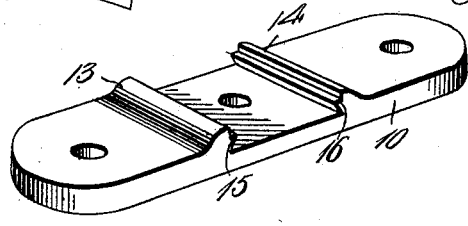
Witnesses
E. K. Stewart
C. H. Woodward
J. L. Pittman, Inventor.
by C. A. Snow & Co.
Attorneys No. 728,972. Patented May 26, 1903.

UNITED STATES PATENT OFFICE.

JOHN LUTHER PITTMAN, OF DUBACH, LOUISIANA.

CONVEYER-CHAIN LINK.

SPECIFICATION forming part of Letters Patent No. 728,972, dated May 26, 1903.

Application filed March 5, 1903. Serial No. 146,385. (No model.)

*To all whom it may concern:*

Be it known that I, JOHN LUTHER PITTMAN, a citizen of the United States, residing at Dubach, in the parish of Lincoln and State of Louisiana, have invented a new and useful Conveyer-Chain Link, of which the following is a specification.

This invention relates to conveyer-chains, more particularly to those employed in sawmills for drawing logs into the mill, but which may be employed in connection with any of the various forms of conveyer-chains used in the industrial arts.

The chains usually employed for handling logs in sawmills and for similar purposes are provided with teeth extending therefrom at suitable intervals and generally pointed to cause them to engage the logs with a more positive grip. The teeth of such chains must be maintained in their sharpened condition to produce the desired results, and when chains having the teeth integral with the links or permanently connected thereto are employed much valuable time is lost in renewing worn-out links or links containing broken or worn teeth, as it is necessary to sever the holding-pivots and frequently remove the chain.

The principal object of the present invention is to produce a chain having detachable and reversible teeth, which may be detached for renewal or repair without removing the chain or detaching any of the links or otherwise disturbing the chain relative to its attachments or the machinery with which it is connected.

To this end the invention consists in certain novel features of construction, as hereinafter shown and described, and specified in the claims.

In the drawings illustrative of the invention, in which corresponding parts are denoted by like designating characters, Figure 1 is a side view, Fig. 2 is a plan view, and Fig. 3 is a transverse section, of a portion of a chain with the improvement applied. Fig. 4 is a perspective view of one of the links detached, and Fig. 5 is a perspective view of one of the teeth detached.

The improved device may be applied to any of the ordinary makes of chains; but for the purpose of illustration a section of an ordinary form of chain is shown constructed of alternating double or spaced links 10 and intermediate single links 11, connected movably by transverse pins or pintles 12. At suitable intervals certain of the spaced links 10 are provided, preferably upon their outer surfaces, with spaced transverse projecting ribs 13 14, each rib provided, respectively, with intermediate overhanging inner ribs 15 16, as shown more clearly in Figs. 2 and 4.

The tooth members are represented at 17 and may be of any desired configuration or size and adapted to fit between the ribs 13 14 and provided with longitudinal channels 18 19, fitting the overhanging inner ribs 15 16, as shown. The tooth members 17 are each formed with a shoulder 20, engaging one edge of its respective link 10 to strengthen and support the juncture of the tooth and link. It will be noted that the edges of the tooth are firmly supported by the square-sided portions of the ribs 13 14 the full length of the ribs and the full width of the links 10 and also supported by the shoulder 20, so that all transverse pressures or strains are efficiently resisted and the tooth thereby very firmly supported and held in place. It will also be noted that any tendency to lateral movement will be resisted by the overhanging inner ribs 15 16 engaging the channels 18 19, and to still further support the tooth in position and prevent it from dropping from the chain a rivet or bolt 21 is secured through the tooth and link, as shown. The rib portions 13 15 and 14 16 being arranged at right angles to the longitudinal axis of the link 10, the tooth may be reversed in position, if desired, as it may be "entered" into its seat upon the link from either side, as will be obvious. This is an important feature of the invention and greatly simplifies the construction and renders it possible to construct the chain links and teeth interchangeable and reversible when desired.

Any of the teeth 17 may readily be detached when broken or worn by simply driving out the rivet 21 and either sharpened and replaced or a new tooth inserted in its place, and the teeth may thus be replaced or repaired without disturbing any other part of the chain. This is also a great advantage, as the "life" of the chain may thus be prolonged, as the teeth are the parts which wear out the most readily and are, moreover, comparatively inexpensive.

It is obvious that the part 17 of the device may be of any desired form or adapted to be employed for any required purpose and that both the links and the detachable portions may be modified as to shape and size without departing from the principle of the invention or sacrificing any of its advantages.

With this device also the form of tooth may be readily changed so as to adapt the same chain to elevate or conduct different kinds of objects or material, and this is also a material advantage and greatly increases the usefulness of the invention.

The teeth may be attached to as many of the links as required to increase or decrease the intervals between them.

Having thus described the invention, what I claim is—

1. In a chain, a link having transverse guide-ribs spaced apart and with overhanging inner surfaces, a tooth fitting reversibly between said ribs and having longitudinal channels corresponding to and engaging said overhanging surfaces of said ribs, and means for connecting said tooth and link, substantially as described.

2. In a chain, a link having transverse guide-ribs spaced apart, and with inwardly-extending overhanging shoulders, a tooth fitting between said ribs and having longitudinal channels corresponding to and engaging said shoulders, and means for connecting said tooth and link, substantially as described.

3. In a chain, a link having transverse guide-ribs spaced apart and projecting laterally therefrom, and with overhanging inner surfaces, a tooth fitting between said ribs and having longitudinal channels corresponding to and engaging said overhanging surfaces of said ribs, and with a transverse shoulder adapted to engage the adjacent edge of the link, substantially as described.

4. In a chain, a link having transverse guide-ribs spaced apart and projecting laterally therefrom and with overhanging inner surfaces, a tooth fitting between said ribs and having longitudinal channels corresponding to and engaging said overhanging surfaces of said ribs, and a bolt or rivet connecting said link and tooth, substantially as described.

In testimony that I claim the foregoing as my own I have hereto affixed my signature in the presence of two witnesses.

JOHN LUTHER PITTMAN.

Witnesses:
L. P. SMITH,
WM. W. ADKERSON.